United States Patent
Schroth et al.

(10) Patent No.: US 10,240,222 B2
(45) Date of Patent: Mar. 26, 2019

(54) CURRENT SCHEDULE FOR OPTIMIZED REACTION METALLURGICAL JOINING

(71) Applicant: GM GLOBAL TECHNOLOGY OPERATIONS LLC, Detroit, MI (US)

(72) Inventors: James G. Schroth, Troy, MI (US); Thomas A. Perry, Bruce Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 841 days.

(21) Appl. No.: 14/789,260

(22) Filed: Jul. 1, 2015

(65) Prior Publication Data

US 2016/0008912 A1    Jan. 14, 2016

Related U.S. Application Data

(60) Provisional application No. 62/021,762, filed on Jul. 8, 2014.

(51) Int. Cl.
| | | |
|---|---|---|
| *B23K 11/11* | (2006.01) | |
| *C22C 9/00* | (2006.01) | |
| *B23K 35/30* | (2006.01) | |
| *B23K 11/16* | (2006.01) | |
| *B23K 11/18* | (2006.01) | |
| *B23K 11/34* | (2006.01) | |

(Continued)

(52) U.S. Cl.
CPC .............. *C22C 9/00* (2013.01); *B23K 11/115* (2013.01); *B23K 11/16* (2013.01); *B23K 11/185* (2013.01); *B23K 11/34* (2013.01); *B23K 35/302* (2013.01); *B23K 2103/04* (2018.08); *B23K 2103/10* (2018.08)

(58) Field of Classification Search
CPC ....... B23K 11/115; B23K 11/16; B23K 11/18; B23K 11/24; B23K 11/241; B23K 11/245; B23K 35/302; B23K 2203/12; B23K 2203/08; C22C 9/00
USPC ........... 228/198; 219/117.1, 118, 86.1, 78.01
See application file for complete search history.

(56) References Cited

U.S. PATENT DOCUMENTS 8,523,045 B2   9/2013   Perry et al.
8,590,768 B2   11/2013  Sigler et al.
(Continued)

FOREIGN PATENT DOCUMENTS

CN   101856757 A  *  10/2010
CN   101856774 A     10/2010
(Continued)

OTHER PUBLICATIONS

"Metal Manuals", Version 3, vol. 6; Welding and Brazing; p. 110, Nov. 1984.

(Continued)

*Primary Examiner* — Tu B Hoang
*Assistant Examiner* — Alba T Rosario-Aponte
(74) *Attorney, Agent, or Firm* — Reising Ethington P.C.

(57) ABSTRACT

A method of joining a first metal workpiece substrate and a second metal workpiece substrate by way of reaction metallurgical joining involves passing a pulsating DC electrical current through the metal workpiece substrates and a reaction material disposed between confronting faying surfaces of the workpiece substrates. The electrical current comprises a plurality of current pulses that generally increase in applied current level.

19 Claims, 3 Drawing Sheets

(51) Int. Cl.
*B23K 103/04* (2006.01)
*B23K 103/10* (2006.01)

(56) References Cited

U.S. PATENT DOCUMENTS

| | | |
|---|---|---|
| 2010/0258537 A1 | 10/2010 | Sigler |
| 2012/0273557 A1* | 11/2012 | Perry .................. B23K 35/302 |
| | | 228/198 |
| 2013/0056447 A1* | 3/2013 | Perry .................. B23K 11/002 |
| | | 219/121.11 |

FOREIGN PATENT DOCUMENTS

| | | | |
|---|---|---|---|
| CN | 101885095 A | * | 11/2010 |
| CN | 103252568 A | | 8/2013 |
| CN | 104668688 A | | 6/2015 |
| EP | 0650798 B1 | | 5/1995 |
| JP | S5850182 A | | 3/1983 |
| JP | 2012125809 A | | 7/2012 |

OTHER PUBLICATIONS

Chen Jinde; "Material Forming Foundation", p. 220, 223-225; Oct. 2000.

"Welding Manuals", Version 3, vol. 2; Welding of the Materials, p. 618, Jan. 2008.

Yin Tianwen; Low Voltage Electrical Apparatus Technical Manuals:, p. 1001-1004; Sep. 2014.

\* cited by examiner

CURRENT SCHEDULE FOR OPTIMIZED REACTION METALLURGICAL JOINING

CROSS-REFERENCE TO RELATED APPLICATION

This application claims the benefit of U.S. Provisional Application No. 62/021,762 filed on Jul. 8, 2014. The entire contents of that provisional application are incorporated herein by reference.

TECHNICAL FIELD

The technical field of this disclosure relates generally to reaction metallurgical joining of metal workpiece substrates and, more particularly, to a schedule for passing current through the metal workpiece substrates and the reaction material disposed between the substrates.

BACKGROUND

Reaction metallurgical joining is a process in which a reaction material is heated and compressed between two metal workpiece substrates to facilitate the formation of a metallurgical joint between the substrates. The reaction material, in particular, is formulated to have a liquidus temperature below the lowest solidus temperature of the two metal workpiece substrates being joined and, additionally, to be reactive with the opposed faying surfaces of the workpiece substrates when disposed between those surfaces and heated above its solidus temperature. After being heated above at least its solidus temperature (and beforehand if desired), a compressive force is applied to the workpiece substrates, which squeezes and laterally spreads the reaction material, including any reaction by-products, along the faying interface of the workpiece substrates. The faying surfaces join together at this time to establish a low-resistivity solid-state metallurgical joint composed mainly of the base workpiece materials as the applied compression substantially expels the reaction material from the joint.

The reactivity of the reaction material enables coalescence without having to melt the metal workpiece substrates. Indeed, during reaction metallurgical joining, the reaction material forms a mobile liquid phase when heated above its solidus temperature, while melting of the facing workpiece substrates is typically avoided. This liquid phase breaks down surface films and materials—such as oxide films—present on the faying metal workpiece surfaces to expose clean portions of the faying surfaces, and can also locally dissolve a skin layer of each faying surface to make them temporarily more amenable to coalescence. The compressive force applied to the metal workpiece substrates—in addition to expelling the reaction material and any reaction by-products—eventually brings the cleaned portions of opposed faying surfaces into direct contact under pressure. A solid-state metallurgical joint ultimately results between the contacting coalescing portions of the opposed faying surfaces. Any leftover residual amounts of the reaction material still present at the faying interface simply re-solidify without substantially impacting the joint properties.

The heat input required to join the metal workpiece substrates by reaction metallurgical joining is relatively low compared to other joining techniques such as MIG welding, TIG welding, laser welding, and resistance spot welding, among others. Unlike those and other welding processes, which intend to generate enough heat to initiate melting of the base metals, reaction metallurgical joining can attain a solid-state joint directly between the metal workpiece substrates without having to generate such heat. As previously explained, reaction metallurgical joining inputs only enough heat to initiate melting of the reaction material, which in turn reacts with the workpiece substrate faying surfaces to initiate coalescence at a temperature below the temperature at which either of the workpiece substrates will begin to melt. The use of reaction metallurgical joining is thus an attractive option when heat-sensitive materials are located in close proximity to the metal workpiece substrates sought to be joined.

The reaction metallurgical joining process can be carried out in a number of ways. One common approach employs a pair of opposed electrodes to both resistively heat the reaction material above its solidus temperature and to compress the metal workpiece substrates. Specifically, the opposed electrodes, which communicate with a power source, impart a pressing force against oppositely-facing surfaces of the workpiece substrates in alignment with one another. The opposed electrodes are operated to pass an electrical current through the workpiece substrates and across their faying interface where the reaction material is present. The resistance to the flow of the electrical current through the reaction material and across the faying interface generates heat. This heat can be controlled to be within a zone that satisfies at least the following two conditions: (1) the heat is sufficient to initiate melting of the reaction material; and (2) the heat is not so excessive that the metal workpiece substrates themselves begin to melt. The opposed electrodes can also supply the compressive force needed to bring about the solid-state metallurgical joint between the contacting coalescing portions of the workpiece faying surfaces.

SUMMARY OF THE DISCLOSURE

A method of practicing reaction metallurgical joining is disclosed in which an electrical current is passed through the workpiece substrates and across a faying interface—where a reaction material is present—according to a current schedule that can be carried out by a controllable power source. The employed current schedule calls for electrical current pulses that generally increase in applied current level; that is, the maximum attained current level of at least 75% of the plurality of current pulses is contained within an amperage band that increases as a function of time from the start of electrical current flow to the stoppage of electrical current flow. Such a current schedule helps maximize joint strength, minimize sticking of the electrodes that exchange the current, and minimize excess heat input during formation of the solid-state metallurgical joint between the metal workpiece substrates.

DETAILED DESCRIPTION

A method of practicing reaction metallurgical joining with a particular current schedule is illustrated in FIGS. 1-7. The method is sometimes described, more specifically, in the context of joining a pair of copper workpiece substrates. Examples of such substrates include phase lead tabs and row jumpers of an electric motor stator. The disclosed reaction metallurgical joining method may of course be used with other types of metal workpiece substrates, including copper alloys that include 96 wt. % or greater Cu and 0-4 wt. % of other alloying elements such as one or more of Cd, Cr, Zr, Mg, Fe, P, Be, Co, S, Te, and Pb. Still further, the disclosed method may be used to join non-copper-based metal workpiece substrates, examples of which include steel and aluminum alloy. Skilled artisans will know and appreciate how to tailor the reaction metallurgical joining process—in particular the composition of the reaction material that is disposed between, and reacts with, the metal substrates—so that the current schedule described herein can be effectively used.

Figure 1:
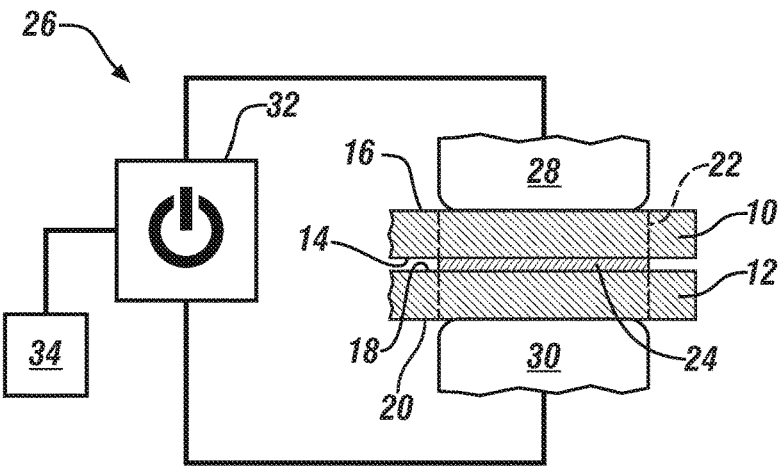
FIG. 1 is a schematic cross-sectional illustration of a pair of metal workpiece substrates that are stacked in confronting relation in preparation for reaction metallurgical joining.

FIG. 1 generally depicts two confronting metal workpiece substrates that are prepared to be joined by reaction metallurgical joining. There, as shown, a first metal workpiece substrate 10 and a second metal workpiece substrate 12 are stacked in overlapping fashion. The first metal workpiece substrate 10 includes a faying surface 14 and an exterior surface 16 and, likewise, the second metal workpiece substrate 12 includes a faying surface 18 and an exterior surface 20. The two faying surfaces 14, 18 confront one another and are separated at a joining location 22 by a reaction material 24, while the two exterior surfaces 16, 20 face away from each other in opposite directions. The first and second metal workpiece substrates 10, 12 may be composed of any suitable metal that is amenable to reaction metallurgical joining. Such materials include, for example, (1) copper having greater than 99.9 wt. % Cu; (2) a copper alloy having 96 wt. % or greater Cu and 0-4 wt. % of other alloying elements such as one or more of Cd, Cr, Zr, Mg, Fe, P, Be, Co, S, Te, and Pb; (3) steel, and (4) an aluminum alloy. The first and second metal substrates 10, 12, moreover, are preferably composed of the same metal composition, but they are not required to be.

The reaction material 24 makes contact with each of the faying surfaces 14, 18 of the first and second metal workpiece substrates 10, 12. The reaction material 24 is formulated to have a liquidus temperature below the lowest solidus temperature of the two metal workpiece substrates 10, 12 being joined and, additionally, to be reactive with the opposed faying surfaces 14, 18 of the workpiece substrates 10, 12 when heated above its solidus temperature such that the opposed faying surfaces 14, 18 can form a solid-state metallurgical joint. The exact composition of the reaction material 24 thus depends on the composition of the metal workpiece substrates 10, 12 being joined. For instance, when the first and second metal workpiece substrates are composed of copper (melting temperature of about 1084° C.) or a copper alloy, the reaction material 24 may be a copper-based reaction material alloy such as a Cu—Ag—P alloy that contains, on a weight percent basis, 70%-95% copper, 2%-20% silver, and 3%-8% phosphorus. Suitable Cu—Ag—P reaction material alloys typically have a solidus temperature in the range of about 640° C.-650° C. and a liquidus temperature in the range of about 640° C.-820° C. In a one specific embodiment, the Cu—Ag—P reaction material alloy may include, on a weight percent basis, 80% copper, 15% silver, and 5% phosphorous, which provides the alloy with a solidus temperature of about 644° C. and a liquidus temperature of about 805° C.

The structure of the interposed reaction material 24 is not limited to any particular construction. For example, in one embodiment, the reaction material 24 may be a pre-formed tape or foil. In this scenario, at the onset of the reaction metallurgical joining process, the tape or foil of the desired reaction material composition may be placed between the first and second metal workpiece substrates 10, 12 from an automated or manual feeder or, alternatively, it may simply be located in position with a manual hand tool such as a pair of tweezers. The reaction material 24 may also be one or more pre-placed braze depositions. In that instance, the desired reaction material composition may be packaged into a consumable electrode rod and deposited on one or both of the workpiece substrate faying surfaces 14, 18 by, for example, oscillating wire arc welding as disclosed in commonly-owned U.S. patent application Ser. No. 14/789,134, the entire contents of which are hereby incorporated by reference.

An apparatus 26 that can perform the reaction metallurgical joining process is also shown schematically in FIG. 1. The apparatus 26 includes a first electrode 28, a second electrode 30, a power source 32, and a controller 34. The first and second electrodes 28, 30 are positioned to make direct contact or indirect contact (i.e., contact through an intermediate member) with the exterior surfaces 16, 20 of the first and second metal workpiece substrates 10, 12, respectively, and to apply pressure to each of those surface 16, 20 at the joining location 22. The electrodes 28, 30 are constructed from an electrically conductive material such as a copper alloy including, for instance, a zirconium copper alloy (ZrCu) that contains about 0.10 wt. % to about 0.20 wt. % zirconium and the balance copper. While not shown specifically in FIG. 1, the first and second electrodes 28, 30 may be mounted on opposed weld gun arms, which are constructed to clamp and press the electrodes 28, 30 against their respective exterior workpiece substrate surfaces 16, 20 in axial facing alignment with each other.

The power source 32 electrically communicates with the first and second electrodes 28, 30 and supplies a DC electrical current for exchange between the electrodes 28, 30. Here, the power source 32 applies a controlled voltage to the first and second electrodes 28, 30 to provide a pulsating DC electrical current that is passed, in accordance with a specified current schedule, between the two electrodes 28, 30 and across the stacked-up first and second metal workpiece substrates 10, 12 and through the interposed reaction material 24. The power source 32 is preferably a medium-frequency DC (MFDC) inverter power supply. A MFDC inverter power supply, in general, includes an inverter and a MFDC transformer. The inverter receives a three phase mains AC current (480V, 60 Hz in the U.S.). The mains AC current is first rectified and then inverted to produce a single phase input AC current, usually a square wave AC current, of higher voltage that is fed to the transformer at, in most applications, 1000 Hz. The transformer then "steps down" the input AC voltage to generate a lower-voltage, higher-amperage AC current which is then fed to the rectifier where a collection of semiconductor diodes converts the supplied AC current into a low-ripple DC current suitable for the present joining process. A MFDC inverter power supply can be obtained commercially from a number of suppliers including Roman Manufacturing (Corporate headquarters in Grand Rapids, Mich.), ARO Welding Technologies (US headquarters in Chesterfield Township, Mich.), and Bosch Rexroth (US headquarters in Charlotte, N.C.).

The controller 34 interfaces with the power source 32 and is programmed to initiate and control the pulsating DC electrical current exchanged between the first and second electrodes 28, 30. Specifically, the controller 34 interfaces with the MFDC transformer and allows a user to input a current schedule that sets and manages certain attributes of the DC electrical current being delivered to the electrodes 28, 30 over the course of a reaction metallurgical joining event. The current schedule allows for customized control of the current level at any given time and the duration of current flow at any given current level, among others, and further allows for such attributes of the current to be responsive to changes in very small time increments of 1 ms or fractions of 1 ms. In this way, the controller 34 instructs the power supply 32 to deliver the DC pulsating electrical current to and between the electrodes 28, 30 and through the bulk of the metal workpiece substrates 10, 12 and the reaction material 24 located at the faying interface 38 within the joining location 22.

A method of establishing a metallurgical joint between the first and second metal workpiece substrates 10, 12 by way of reaction metallurgical joining is shown and described with reference to FIGS. 1-7. To begin, as shown in FIG. 1, the first electrode 28 is preferably brought into direct contact with the exterior surface 16 of the first metal workpiece substrate 10 and the second electrode 30 is preferably brought into direct contact with the exterior surface 20 of the second metal workpiece substrate 12. The two electrodes 28, 30 apply pressure to their respectively-engaged exterior surfaces 16, 20 (either one or both of the electrodes 28, 30 being mechanically moveable by the weld gun arms) to generate a compressive force on the substrates 10, 12 at the joining location 22. A DC electrical current delivered from the power source 32 is then exchanged between the electrodes 28, 30 and across the faying surfaces 14, 18 of the metal workpiece substrates 10, 12. This electrical current passes through the reaction material 24 located between the faying surfaces 14, 18 and, as will be further described below, is comprised of electrical current pulses that generally increase in applied current level and optionally generally increase in amplitude.

Figure 2:
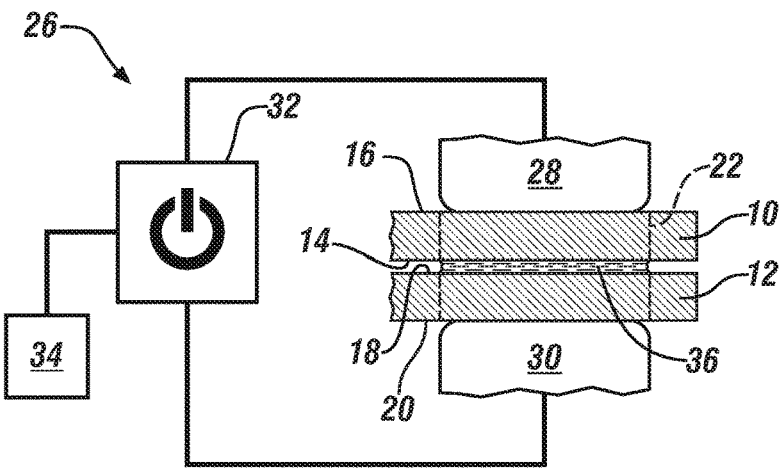
FIG. 2 is a schematic cross-sectional illustration of a reaction material that is melting between a pair of confronting metal workpiece substrates in response to a passing electrical current.

Because the reaction material 24 is more thermally and electrically resistive than the two metal workpiece substrates 10, 12, and because the electrodes 28, 30 themselves are able to extract and sink heat as a consequence of being water-cooled, the passing electrical current generates heat that is largely confined within the reaction material 24. Such localized heat generation, which is managed by the controller 34, heats the reaction material 24 to above its solidus temperature—and even to above its liquidus temperature if desired—while keeping the temperature of the reaction material 24 below the solidus temperature of the first and second metal workpiece substrates 10, 12 (or below the melting point if the solidus temperature and liquidus temperature of the metal are the same). As a result, as illustrated in FIG. 2, the reaction material 24 melts partially or fully into a molten reaction material 36. And while the reaction material 24 melts under the influence of localized resistive heating, the first and second metal workpiece substrates 10, 12 do not melt, even at their faying surfaces 14, 18.

Upon being melted, the molten reaction material 36 reacts with the faying surfaces 14, 18 of the first and second metal workpiece substrates 10, 12 and renders them suitable for coalescence. Such reactivity typically involves breaking down surface films and materials to expose cleaned portions of the faying surfaces 14, 18 and, additionally, but not necessarily, locally dissolving a skin layer of one or both of the faying surfaces 14, 18. The reaction material 24 can even be self-fluxing, as is the case with the Cu—Ag—P reaction material alloy composition mentioned above due primarily to its phosphorous component, which helps further promote coalescence by fluxing away surface oxides and shielding the area surrounding the joining location 22 from contamination by atmospheric oxygen.

Figure 3:
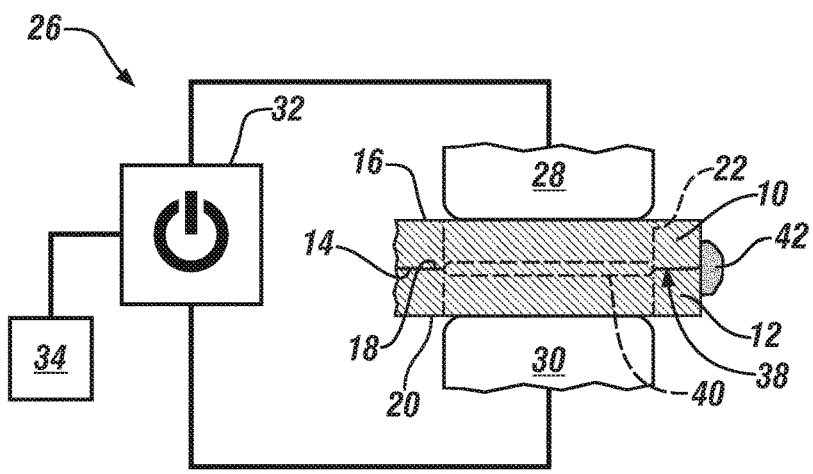
FIG. 3 is a schematic cross-sectional illustration of a pair of metal workpiece substrates that are joined by a solid-state metallurgical joint that has been established by reaction metallurgical joining.

The electrical current being exchanged between the electrodes 28, 30 may be ceased after the reaction material 24 is sufficiently melted while the pressure imparted by the electrodes 28, 30 to the workpiece substrates 10, 12 is continued. The compressive force applied by electrodes 28, 30, in turn, compresses the first and second metal workpiece substrates 10, 12 and squeezes the molten reaction material 36 laterally along a faying interface 38 of the workpiece substrates 10, 12 together with any reaction by-products that may have been produced. Eventually, as depicted in FIG. 3, the faying surfaces 14, 18 of the first and second metal workpiece substrates 10, 12 make contact and begin to coalesce under pressure. The contacting coalescing portions of the faying surfaces 14, 18 become joined soon after the molten reaction material 36 is expelled from the faying interface 38 to establish a solid-state metallurgical joint 40 between the metal workpiece substrates 10, 12. This joint 40 is composed mainly of metal derived from the first and second metal workpiece substrates 10, 12 themselves, making it structurally sound and minimally disruptive, while the molten reaction material 36 expelled from the faying interface 38 may accumulate and harden into a residual nugget 42 on the exterior of the metal workpiece substrates 10, 12.

Figure 4:
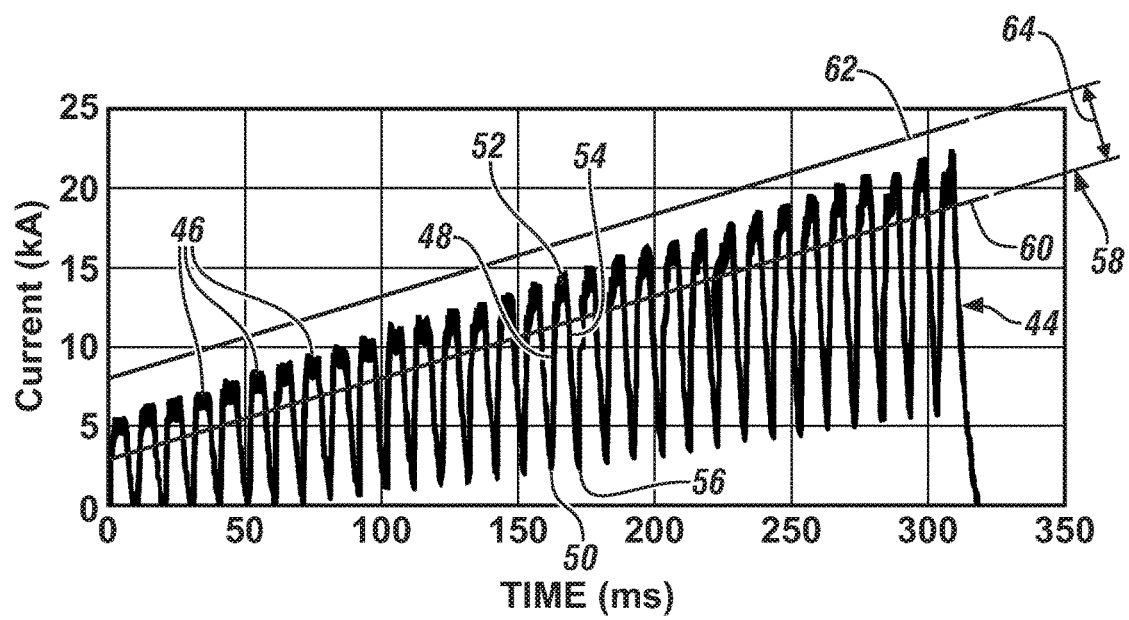
FIG. 4 is a graphical depiction of an exemplary current schedule that includes electrical current pulses that generally increase in applied current level.

As mentioned above, the electrical current exchanged between the first and second electrodes 28, 30 during the reaction metallurgical joining process is a pulsating one. A representative graphical depiction of such a pulsating electrical current is shown in FIG. 4 and is represented by reference numeral 44. The electrical current 44 includes a plurality of current pulses 46. Each current pulse 46 includes a current ramping leg 48 that rises from a starting current level 50, a maximum attained current level 52, and a current decay leg 54 that falls to an ending current level 56. The ending current level 56 of one current pulse 46 and the starting current level 50 of the next succeeding current pulse 46 may be the same, as shown, or they may be different. Moreover, the current ramping leg 48 and the current decay leg 54 do not necessarily have to meet at the maximum attained current level 52 since, as shown here, the current level of the pulse 46 may fluctuate for a period of about 2-10 ms after the current ramping leg 48 and before current decay leg 54. The maximum attained current level 52 could be realized at any point during such period of instantaneous current level fluctuation including at the end of the current ramping leg 48, the beginning of the current decay leg 54, or at any point in between.

The electrical current pulses 46 generally increase in applied current level. This occurs when at least 75%—and preferably 100%—of the maximum attained current levels 52 of the current pulses 46 are contained within an amperage band 58 that increases as a function of time from the start of electrical current flow to the stoppage of electrical current flow. The amperage band 58 is defined by a lower amperage limit 60 and an upper amperage limit 62. The amperage limits 60, 62 have positive linear slopes. They are also parallel to one another such that an amperage bandwidth 64 taken perpendicular to the lower and upper amperage limits 60, 62 ranges from about 2 kA to about 6 kA. And while not required, the starting and ending current levels 50, 56 of every current pulse 46 may be located below the amperage band 58, meaning that both the current ramping leg 48 and the current decay leg 54 of each current pulse 46 cross over the lower amperage limit 60 during the current level ramping up period and the current level decay period, respectively.

In one particular example, as depicted in FIG. 4, the lower amperage limit 60 is denoted (in kiloamperes (kA)) by the equation 0.05(t)+3 and the upper amperage limit 62 is denoted (in kiloamperes (kA)) by the equation 0.05(t)+8, where (t) represents time in milliseconds (ms) as tracked on the x-axis. The lower and upper amperage limits 60, 62 thus have a positive slope of 5 kA per 100 ms and provide the bandwidth 64 with a constant value of about 4.5 kA from the start of electrical current flow (0 ms) to the stoppage of electrical current flow (about 318 ms). Moreover, as can be seen in FIG. 4, the maximum attained current level 52 of every current pulse 46 (i.e., 100% of the current pulses 46) lies within the amperage band 58. Indeed, the current ramping leg 48 of each electric current pulse 46 crosses over and terminates above the lower amperage limit 60 and, likewise, the current decay leg 54 of each current pulse 46 crosses over and terminates below the lower amperage limit 60. Additionally, the starting and ending current levels 50, 56 of every current pulse 46 are located below the amperage band 58, although as indicated before this does not necessarily have to be the case.

Figure 5:
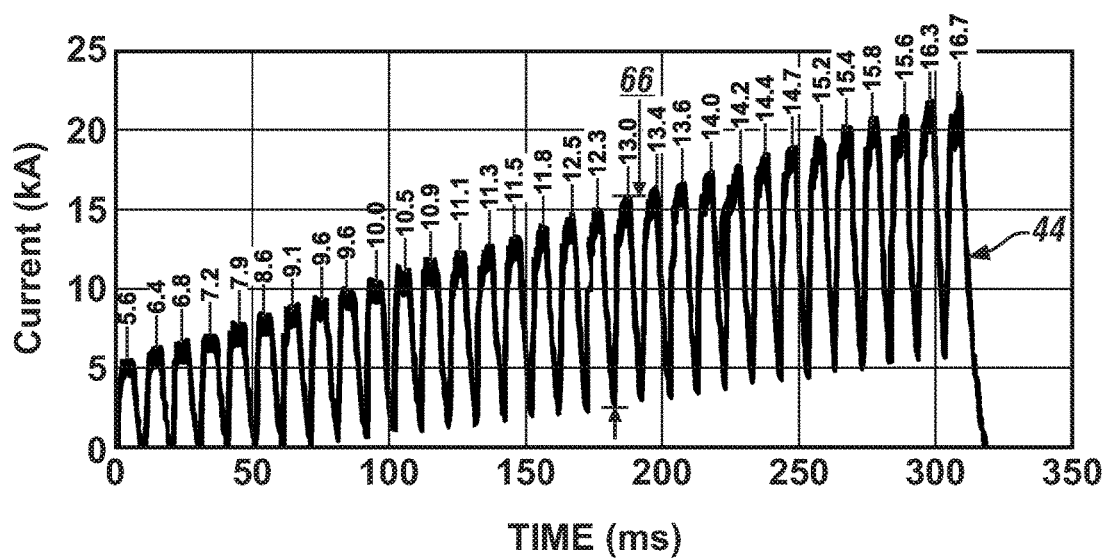
FIG. 5 shows the amplitude of each electrical current pulse in FIG. 4.
Figure 6:
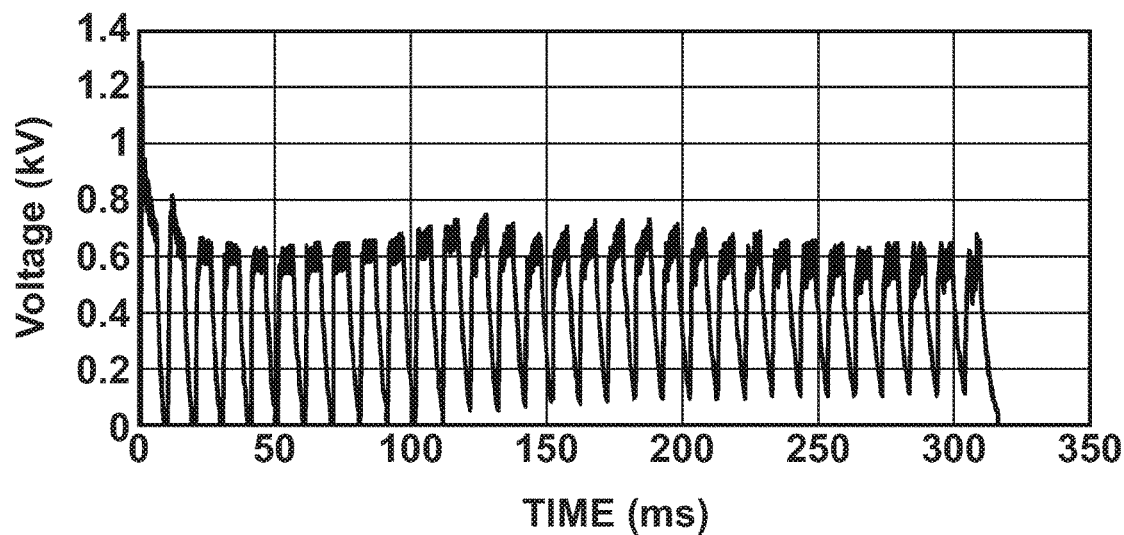
FIG. 6 is a graphical depiction of a voltage that accompanies the current schedule depicted in FIG. 4.
Figure 7:
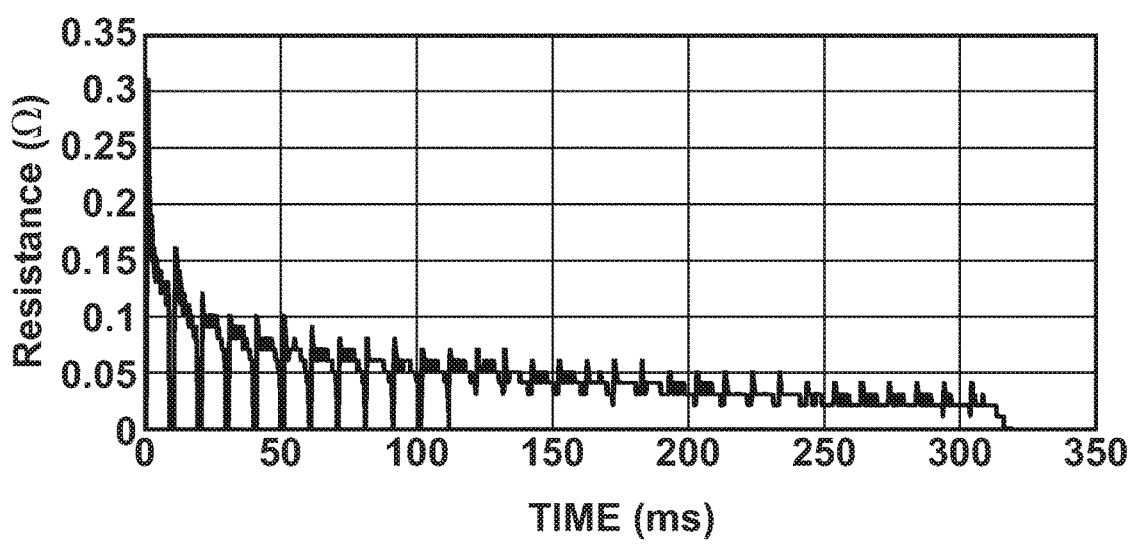
FIG. 7 is a graphical depiction of a resistance that accompanies the current schedule depicted in FIG. 4.

The electrical current pulses 46 may also experience a general increase in amplitude as a function of time. Referring now to FIG. 5, which depicts the same pulsating electrical current 44 as FIG. 4, the difference between the starting current level 50 and the maximum attained current level 52 of each current pulse 46 establishes an amplitude 66 for that particular current pulse 46. The amplitudes 66 of the electrical current pulses 46 are considered to generally increase with time when the following conditions are met: (1) the current pulses 46 of the electrical current 44 are separated into blocks of five consecutive pulses 46 starting with the first current pulse and ending with the last current pulse that completes a five pulse block; (2) the amplitudes 66 of each of the electrical current pulses 46 in each block are used to calculate an average amplitude for that block; and (3) the average amplitude for each block increases when moving along the x-axis (time in ms) with increasing time from the start of electrical current flow. The amplitude 66 of each current pulse 46 included in the electrical current 44 is listed here in FIG. 5. There, it can be seen that the current pulses 46 experience a general increase in amplitude, as the 5-pulse blocks of current pulses 46 have increasing average amplitudes of 6.8 kA (pulses 1 to 5), 9.4 kA (pulses 6 to 10), 11.1 kA (pulses 11 to 15), 12.6 kA (pulses 16 to 20), 14.2 kA (pulses 21 to 25), and 15.7 kA (pulses 26 to 30).

Without being bound by theory, it is currently believed that the pulsating electrical current flow contributes to a stronger and more structurally-sound metallurgical joint 40 between the metal workpiece substrates 10, 12 in at least two ways. First, the electrical current pulses 46 help melt the reaction material 24 at a more controllable rate. This gives the metal workpiece substrates 10, 12 time to collapse onto each other in order to sustain the current flow and avoid a situation where an electrical potential difference attained across the still separated faying surfaces 14, 18 results in undesirable arcing. Stated differently, the initial low current electrical pulses 46 warm the alloy and allow some compression so that the gap between the faying surfaces 14, 18 begins to close—leading to a reduction in the resistance—with melting of the reaction material 24 eventually being initiated at a lower applied current level than if a current of constant amperage and short duration is applied. As support for this theory, FIGS. 6-7 graphically illustrate, as a function of time, the voltage and the resistance values observed for the pulsating electrical current 44 shown in FIG. 4. Second, the increases and decreases of current level that accompany each electrical current pulse 46 are thought to induce thermal expansion and contraction cycles in the molten reaction material 36 that promote reactivity at the interfaces of the molten reaction material 36 and the faying surfaces 14, 18 of the metal workpiece substrates 10, 12.

The above description of preferred exemplary embodiments and specific examples are merely descriptive in nature; they are not intended to limit the scope of the claims that follow. Each of the terms used in the appended claims should be given its ordinary and customary meaning unless specifically and unambiguously stated otherwise in the specification.

The invention claimed is:

1. A method of joining a first metal workpiece substrate and a second metal workpiece substrate by way of reaction metallurgical joining, the method comprising:

providing a first metal workpiece substrate and a second metal workpiece substrate, the first and second metal workpiece substrates being stacked in overlapping fashion such that a faying surface of the first metal workpiece substrate confronts a faying surface of the second metal workpiece substrate, and wherein a reaction material is disposed between the faying surface of the first metal workpiece substrate and the faying surface of the second metal workpiece substrate at a joining location, the reaction material having a liquidus temperature below both a solidus temperature of the first metal workpiece substrate and a solidus temperature of the second metal workpiece substrate;

passing a pulsating DC electrical current through the reaction material to resistively heat the reaction material and cause the reaction material to at least partially melt into a molten reaction material that contacts both the faying surface of the first metal workpiece substrate and the faying surface of the second metal workpiece substrate, neither the first metal workpiece substrate nor the second metal workpiece substrate being melted during passage of the pulsating DC electrical current, and wherein the pulsating DC electrical current comprises a plurality of current pulses, each of which has a maximum attained current level, and wherein the plurality of electrical current pulses increase in applied current level such that at least 75% of the maximum attained current levels are contained within an amperage band defined by an upper amperage limit and a lower amperage limit, the upper amperage limit and the lower amperage limit having positive linear slopes and being parallel to each other so as to provide the amperage band with a bandwidth of between 2 kA and 6 kA; and pressing the first and second metal workpiece substrates together while the molten reaction material is present between the faying surfaces of the first and second metal workpiece substrates, the passing of the pulsating DC electrical current and the pressing together of the first and second metal workpiece substrates resulting in formation of a solid state metallurgical joint between the faying surfaces of the first and second workpiece substrates.

2. The method set forth in claim 1, wherein the first metal workpiece substrate is composed of copper or a copper alloy, and wherein the second metal workpiece substrate is composed of copper or a copper alloy.

3. The method set forth in claim 2, wherein the reaction material is a self-fluxing copper-based reaction material alloy.

4. The method set forth in claim 3, wherein the reaction material comprises a Cu—Ag—P reaction material alloy.

5. The method set forth in claim 1, wherein the step of pressing the first and second metal workpiece substrates together comprises:
  contacting the first metal workpiece substrate with a first electrode and contacting the second metal workpiece substrate with a second electrode, the first and second electrodes being in axial facing alignment with each other at the joining location; and
  applying a compressive force to the first and second metal workpiece substrates through the application of pressure by the first electrode and the second electrode on the first metal workpiece substrate and the second metal workpiece substrate, respectively.

6. The method set forth in claim 1, wherein 100% of the maximum attained current levels are contained within the amperage band.

7. The method set forth in claim 6, wherein each of the plurality of electrical current pulses has a starting current level and an ending current level, and wherein the starting current level and the ending current level of each electrical current pulse are below the amperage band.

8. The method set forth in claim 1, wherein each of the plurality of electrical current pulses has an amplitude, and wherein the amplitudes of the plurality of electrical current pulses increase with time.

9. A method of joining a first metal workpiece substrate and a second metal workpiece substrate by way of reaction metallurgical joining, the method comprising:
  stacking a first metal workpiece substrate and a second metal workpiece substrate such that a faying surface of the first metal workpiece substrate confronts a faying surface of the second metal workpiece substrate, and wherein a reaction material having a liquidus temperature below both a solidus temperature of the first metal workpiece substrate and a solidus temperature of the second metal workpiece substrate is disposed between the faying surfaces of the first and second metal workpiece substrates;
  passing a pulsating DC electrical current through the reaction material to resistively heat the reaction material to a temperature above a solidus temperature of the reaction material yet below the solidus temperature of the first metal workpiece substrate and the solidus temperature of the second metal workpiece substrate, the pulsating DC electrical current comprising a plurality of electrical current pulses, each of which has a maximum attained current level, and wherein the plurality of electrical current pulses increase in applied current level such that at least 75% of the maximum attained current levels are contained within an amperage band defined by an upper amperage limit and a lower amperage limit, the upper amperage limit and the lower amperage limit having positive linear slopes and being parallel to each other so as to provide the amperage band with a bandwidth of between 2 kA and 6 kA; and
  pressing the first and second metal workpiece substrates together at least during passage of the pulsating DC electrical current to form a solid state metallurgical joint between the faying surface of the first metal workpiece substrate and the faying surface of the second metal workpiece substrate.

10. The method set forth in claim 9, wherein the first metal workpiece substrate is composed of copper or a copper alloy, and wherein the second metal workpiece substrate is composed of copper or a copper alloy.

11. The method set forth in claim 10, wherein the reaction material comprises a Cu—Ag—P reaction material alloy.

12. The method set forth in claim 9, wherein the step of pressing the first and second metal workpiece substrates together comprises:
  contacting the first metal workpiece substrate with a first electrode and contacting the second metal workpiece substrate with a second electrode, the first and second electrodes being in axial facing alignment with each other at the joining location; and
  applying a compressive force to the first and second metal workpiece substrates through the application of pressure by the first electrode and the second electrode on the first metal workpiece substrate and the second metal workpiece substrate, respectively.

13. The method set forth in claim 9, wherein 100% of the maximum attained current levels are contained within the amperage band.

14. The method set forth in claim 9, wherein each of the plurality of electrical current pulses has an amplitude, and wherein the amplitudes of the plurality of electrical current pulses increase with time.

15. A method of joining a first metal workpiece substrate and a second metal workpiece substrate by way of reaction metallurgical joining, the method comprising:
  stacking a first metal workpiece substrate and a second metal workpiece substrate such that a faying surface of the first metal workpiece substrate confronts a faying surface of the second metal workpiece substrate, and wherein a reaction material having a liquidus temperature below both a solidus temperature of the first metal workpiece substrate and a solidus temperature of the second metal workpiece substrate is disposed between the faying surfaces of the first and second metal workpiece substrates;
  contacting the first metal workpiece substrate with a first electrode and contacting the second metal workpiece substrate with a second electrode, the first and second electrodes being in axial facing alignment with each other at a joining location;
  applying a compressive force to the first and second metal workpiece substrates through the application of pressure by the first electrode and the second electrode on the first metal workpiece substrate and the second metal workpiece substrate, respectively; and
  passing a pulsating DC electrical current between the first and second electrodes and through the reaction material to resistively heat the reaction material thereby causing the reaction material to melt without melting the first and second metal workpiece substrates, the pulsating DC electrical current comprising a plurality of current pulses, each of which has a maximum attained current level, and wherein the plurality of electrical current pulses generally increase in applied current level such that at least 75% of the maximum attained current levels are contained within an amperage band defined by an upper amperage limit and a lower amperage limit, the upper amperage limit and the lower amperage limit having positive linear slopes and being parallel to each other so as to provide the amperage band with a bandwidth of between 2 kA and 6 kA.

16. The method set forth in claim 15, wherein the first metal workpiece substrate is composed of copper or a copper alloy, wherein the second metal workpiece substrate is composed of copper or a copper alloy, and wherein the reaction material is self-fluxing copper-based reaction material alloy.

17. The method set forth in claim 16, wherein the reaction material comprises a Cu—Ag—P reaction material alloy that contains, on a weight percent basis, 70%-95% copper, 2%-20% silver, and 3%-8% phosphorus.

18. The method set forth in claim 15, wherein 100% of the maximum attained current levels are contained within the amperage band.

19. The method set forth in claim 15, wherein each of the plurality of electrical current pulses has an amplitude, and wherein the amplitudes of the plurality of electrical current pulses increase with time.

\* \* \* \* \*